United States Patent

Kvalheim

[15] 3,665,982
[45] May 30, 1972

[54] ADJUSTABLE TRIM SAW APPARATUS FOR MITER CUTS AND SAW KERFS

[72] Inventor: Andrew M. Kvalheim, Petaluma, Calif.
[73] Assignee: Kvalheim Machinery Co., Petaluma, Calif.
[22] Filed: Feb. 13, 1970
[21] Appl. No.: 11,191

[52] U.S. Cl..............................143/6 H, 143/46 D, 143/46 F, 144/245 D, 144/245 E
[51] Int. Cl. ......................................B27b 5/36, B27b 25/04
[58] Field of Search...................143/6, 6.46, 46, 46.3, 46.37, 143/46.55, 36, 36.37, 35; 144/245, 245.3, 245.4, 3 A, 3 B, 242.10, 242.2, 242

[56] References Cited

UNITED STATES PATENTS

| | | | |
|---|---|---|---|
| 2,302,878 | 11/1942 | Muhl et al. | 144/245 D UX |
| 1,968,091 | 7/1934 | Nash | 144/35 |
| 1,428,036 | 9/1922 | Johnson | 144/242 R X |
| 1,838,780 | 12/1931 | Miller et al. | 144/245 D X |
| 3,147,782 | 9/1964 | Pearl | 144/245 R X |
| 3,540,498 | 11/1970 | Woloveke et al. | 143/6 R |
| 2,814,319 | 12/1957 | Hetman et al. | 143/46 R X |
| 3,380,494 | 4/1968 | Mayo | 143/36 X |

Primary Examiner—Andrew R. Juhasz
Assistant Examiner—James F. Coan
Attorney—Keith Misegades and George R. Douglas, Jr.

[57] ABSTRACT

A saw assembly for multiple cutting of a workpiece, for example, miter and kerf cuts for splines for preformed door jamb assembly trim comprising a main frame, a first, fixed table support including a movable miter saw and a movable kerf saw, a second, movable carriage having another movable miter saw and another movable kerf saw, manual or motor means for moving the carriage with respect to the first table, a brake for locking the carriage in a predetermined position, a reciprocating conveyor arrangement to carry workpieces through the machine, and a hopper for storing workpieces to be fed to the conveyor. Each miter saw may be adjusted in a vertical and horizontal plane. Each workpiece is stagger-fed through the invention by means of the conveyor cooperating with clamp means, programmed to lock the workpiece in position as it is sawed, first by the miter saws, and then by the kerf saws. A kickout cylinder and piston is located adjacent each miter saw to move the workpiece quickly away after one pass of the saw to prevent tearing of the workpiece.

5 Claims, 7 Drawing Figures

Patented May 30, 1972
3,665,982
3 Sheets-Sheet 1
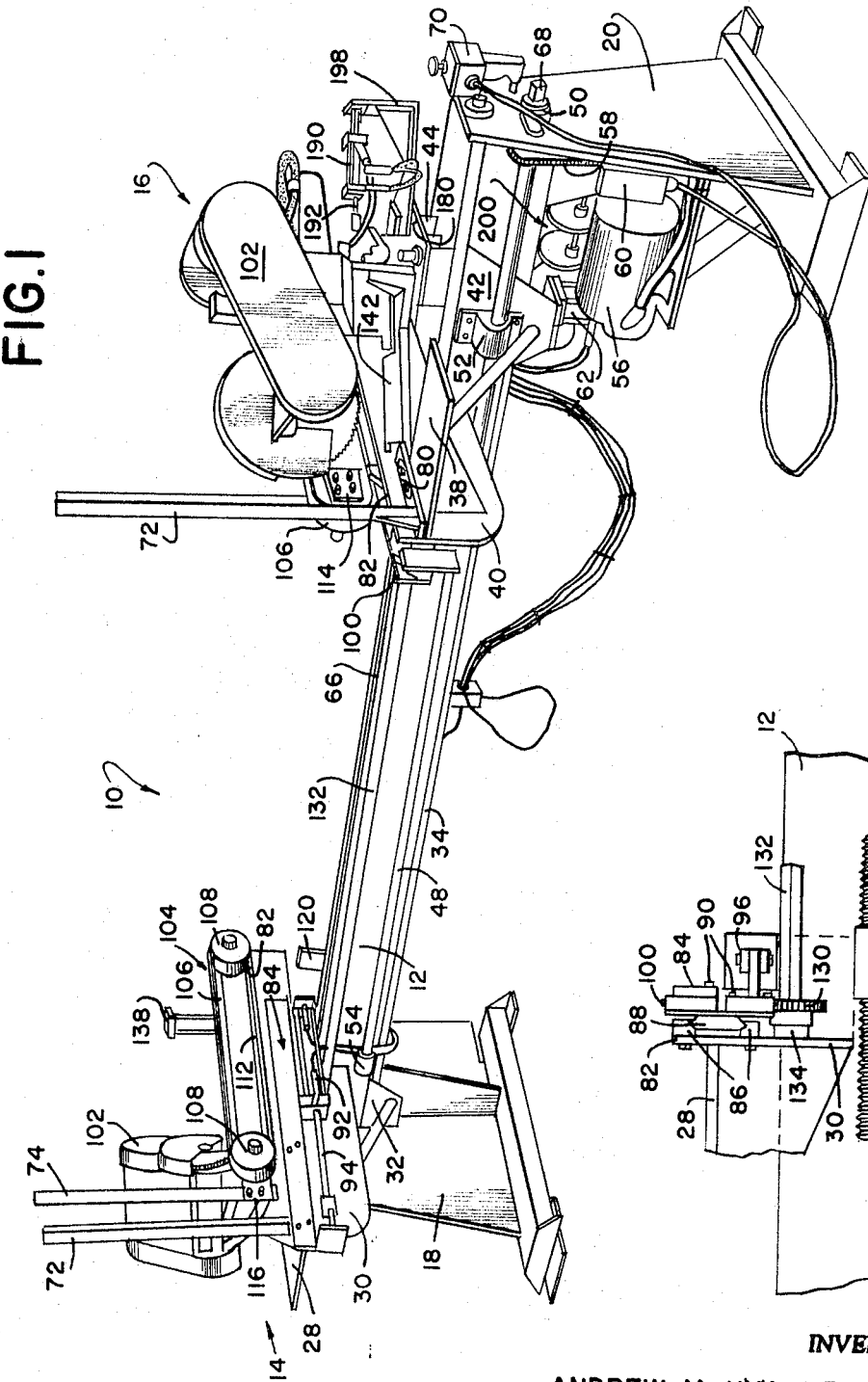
INVENTOR
ANDREW M. KVALHEIM
BY *Misegades + Douglas*
*Keith Misegades*
ATTORNEYS

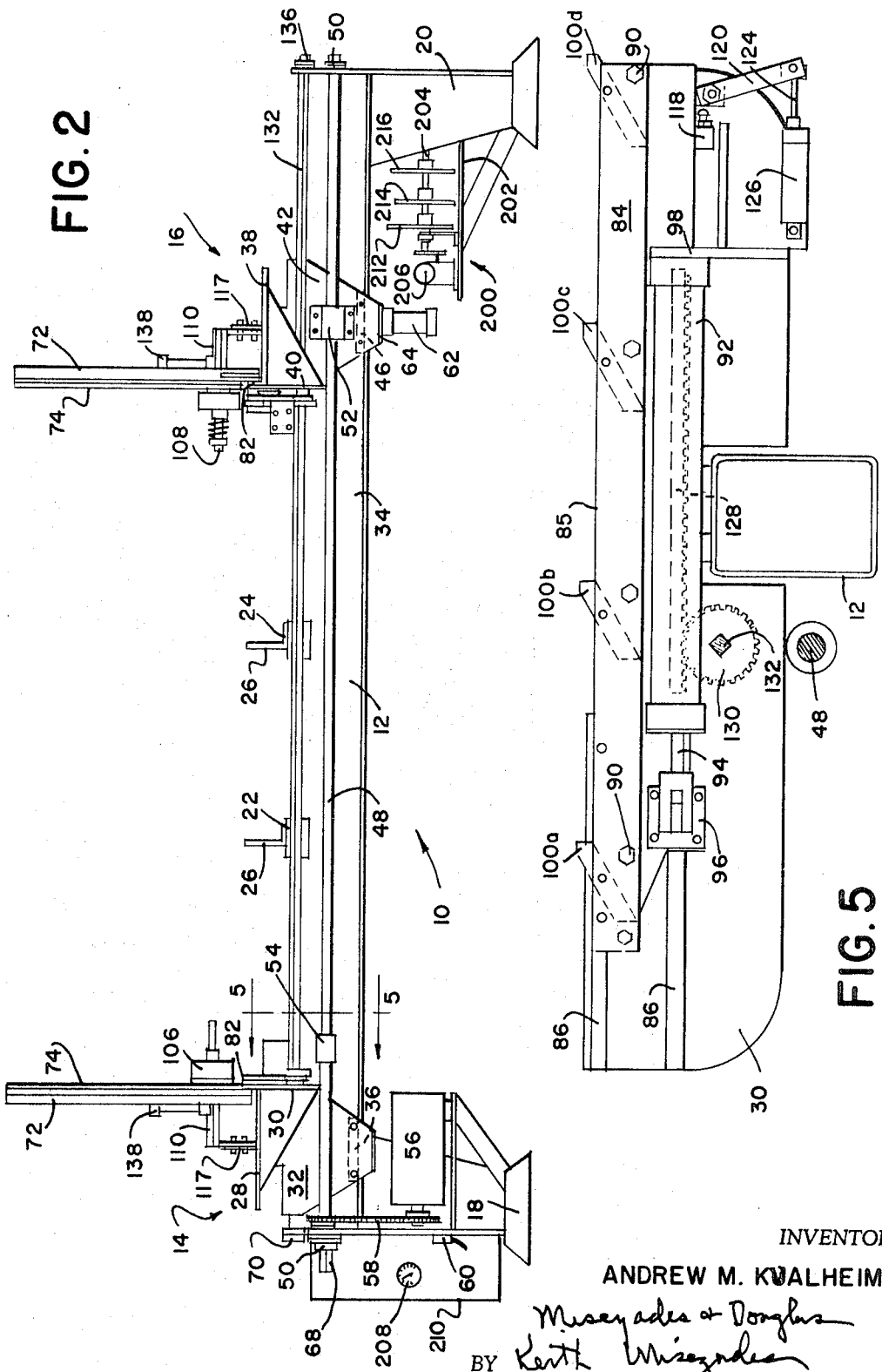

Patented May 30, 1972
3,665,982
3 Sheets-Sheet 3
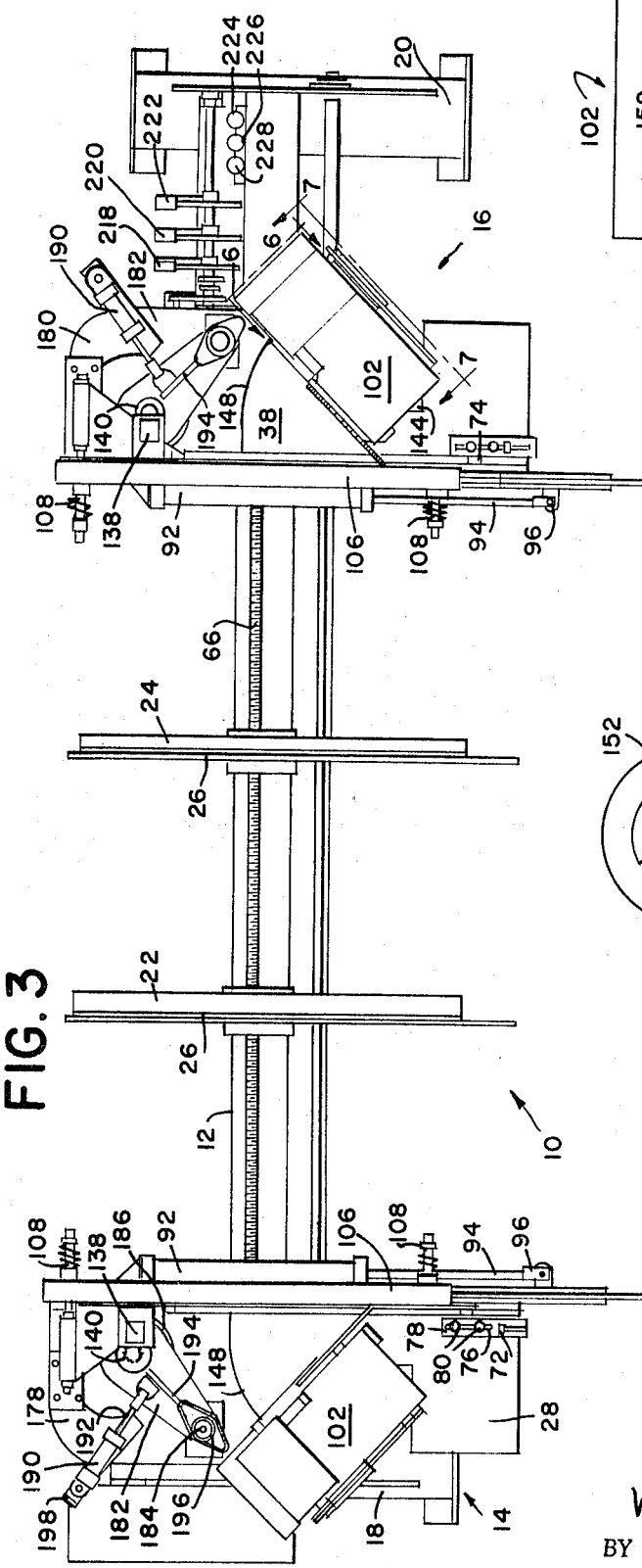
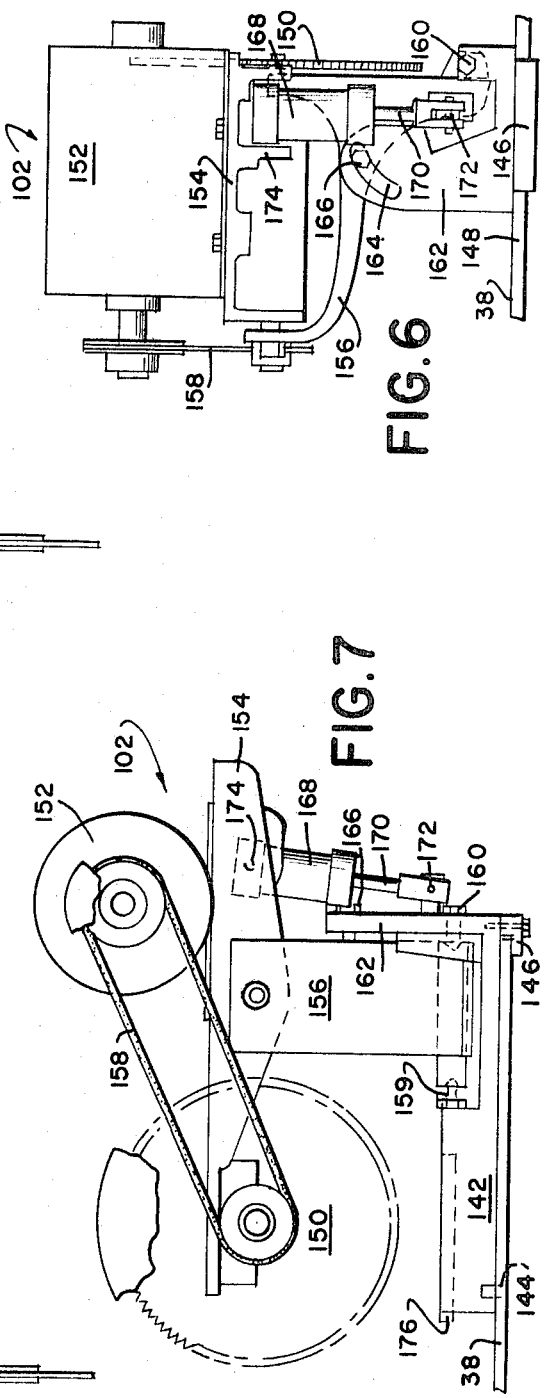
INVENTOR
ANDREW M. KVALHEIM
BY Misegades + Douglas
Keith Misegades
ATTORNEYS

ADJUSTABLE TRIM SAW APPARATUS FOR MITER CUTS AND SAW KERFS

BACKGROUND OF THE INVENTION

The invention relates generally to multiple cut saw assemblies, and more particularly to a machine having multiple circular saws for compound cuts which, in a preferred application, is specifically adapted to miter and kerf the head and side trim pieces for prefabricated door jamb assemblies.

The more recent prior art in this rather highly specialized field includes rather sophisticated inventions which have answered the basic problems of precision and labor saving, but, prior to the instant invention, there is little concern noted for the dual questions of precise, clean cut, coupled with high speed operation. The more remote art includes U.S. Pat. No. 2,789,598, issued to George C. Berger, which discloses a combined dado and saw cut machine, which comprises a main frame assembly, a movable carriage having both a vertical saw and a horizontal dado thereon, and a bank of drills for fabricating a precise piece of lumber. Both the saw and dado are immobile during a cut, and each workpiece must be individually clamped to a support and then moved into and out of the machine. Thus, each piece passes twice by the cutting apparatus, which may distort the desired cut, and, inherently, speed of operation is not acquired. Improvement in this art is noted in a trilogy of U.S. Patents issued to George L. Mayo, which are Nos. Reissue 25,715; 3,229,732; and 3,380,494. The basic, reissue patent illustrates a saw assembly having two banks of two circular saws each, dog conveyor means for moving workpieces through the machine, and a carriage for two of the four saws, movable linearly with respect to the other two saws, and having part of the conveyor means movable therewith. Each saw may be adjusted in a vertical plane, with respect to its axis of rotation. Again, the saws are immobile during a cut, thereby possibly permitting tears in the workpiece during a cut. Additionally, the feed of workpieces through the device is continuous, rather than staggered. In the second Mayo patent, the device moves workpieces through the machine in uniplanar, rather than multiplanar fashion. The third Mayo patent adds a positive workpiece engaging and ejecting conveyor, and a workpiece feed bed.

U.S. Pat. No. 3,388,727, issued to Claudius F. Kotilla discloses a machine which operates in a fashion similar to the machines disclosed in the three Mayo patents. However, workpiece feed is continuous rather than staggered, and each saw, as in the Mayo patents, is adjustable uniplanarly only, rather than multiplanarly as in the instant invention. U.S. Pat. No. 2,917,089 issued to James W. Ennis illustrates another reciprocal action trimmer wherein the individual saws move to cut while the workpieces are locked in a static position. The problem of precise cut for exact fit of trim pieces is discussed in U.S. Pat. No. 2,940,485 issued to Warren B. Zern, which shows a device for bowing the the workpiece at its center in order to feather miter the edge.

However the prior art just discussed is arranged for maximum utility of what it teaches, three points, which are essential to the instant invention, remain undisclosed. First, there is no teaching of a multiplanarly adjustable bank of trim saws. Secondly, no satisfactory provision is made to assure an absolutely clean and precise cut in the workpiece. Finally, there is no disclosure of a device which will continually feed workpieces through the arrangement of trim saws, yet firmly lock each piece in a static mode as a cut is made, thereby assuring a clean and even cut.

SUMMARY OF THE INVENTION

The invention claimed is in a saw assembly for multiple cutting of a workpiece, which includes a main frame, two pairs of saws each movable into the workpiece to cut the same, and means for conveying a plurality of workpieces through the saw assembly, the improvements comprising means mounting one of the pairs of saws for individual multiplanar adjustment, a kicker assembly for moving the workpiece to another station immediately after one pass of a saw therethrough, and improved conveyor means wherein workpieces are continuously fed through the invention, but securely locked in a static mode for each cutting operation whereby a neat, clean, and precise cut is obtained.

BRIEF DESCRIPTION OF THE DRAWINGS

Details of construction and operation of the invention will become apparent by reference to the following drawings, wherein:

FIG. 1 is a perspective view of the invention, taken from the workpiece feed side thereof;

FIG. 2 is a front, elevational view of the invention, again taken from the workpiece feed end of the invention, but with the saws removed, for clarity;

FIG. 3 is a top plan view of the invention;

FIG. 4 is a detail view, taken from the middle, left-hand portion of FIG. 2, and drawn to an enlarged scale;

FIG. 5 is a sectional view taken along lines 5—5 of FIG. 2, and drawn to an enlarged scale;

FIG. 6 is a detail view taken along lines 6—6 of FIG. 3, and drawn to an enlarged scale; and FIG. 7 is another detail view taken along lines 7—7 of FIG. 3, and also drawn to an enlarged scale.

DESCRIPTION OF THE PREFERRED EMBODIMENT

Referring now to the drawings by reference character, a saw assembly 10 for miter and kerf cuts in the trim pieces of a door jamb assembly is illustrated, comprising a central, elongated frame 12, a first, stationary saw and feed apparatus 14, and a second, movable saw and feed carriage apparatus 16. Saw apparatus 14 appears to the left in the sense of FIGS. 1, 2 and 3. The particular configuration and structure of frame 12 is not critical, but preferably it is of elongated tubular steel construction, and includes a pair of stands 18 and 20, each made of sturdy metal plate stock, individual pieces thereof being welded or otherwise suitably joined together. FIGS. 3 and 4 indicate a pair of auxiliary support members 22 and 24, arranged to support the central portions of the workpieces as they pass through the invention. The support members 22, 24 are movable along the length of frame 12 to a plurality of fixed positions thereon so that they are equispaced from each other and from saw apparatuses 14 and 16; bed plates 26, 26 are secured for vertical and horizontal adjustment on members 24 by suitable means, such as slots formed in plates 26, with bolts therethrough, threaded to members 24, 24 (not shown). The positioning of members 22, 24 on frame 12 will be changed when saw apparatus 16 is moved inwardly or outwardly with respect to fixed saw apparatus 14.

Saw apparatus 14 includes a stationary saw table 28, a vertically disposed conveyor support 30, which is welded to table 28, and an inverse trapezoidal support leg 32, welded to and depending from the workpiece feed end of saw table 28. These pieces 28, 30, 32 are firmly attached to frame 12 by clamps, bolts or welding (not shown). FIG. 3 indicates that the lower, feed side of frame 12 has a lip or rail 34 formed thereon. Trapezoidal support 32 may have a support skid 36 bolted between it and frame 12, and arranged to rest on rail 34, for further stationary integrity of saw apparatus 14. The support portion of movable saw apparatus 16 comprises a carriage having similar support pieces which include a saw table 38, vertical conveyor support 40, and an inverse trapezoidal leg support 42; these pieces are merely formed in mirror image to the pieces 28, 30 and 32 of stationary saw apparatus 14 and are not bolted to frame 12. Conversely, saw apparatus 16 is arranged to ride across the length of frame 12 by means of skids or rollers 44, 44, located beneath table 38, trapezoidal leg support skid 46, which rides on rail 34 and a pair of rollers mounted one on each side of vertical support 40, on the discharge side of the invention, each rotatable about a vertical axis and arranged to contact the vertical face of frame 12 opposite that on which rail 34 is mounted (not shown). Controlled movement of saw apparatus 16 with respect to apparatus 14, inwardly and outwardly thereof, is accomplished by means of a threaded rod 48 secured in bearings 50, 50 in stands 18, 20. Rod 48 is threaded through an internally threaded nut block 52, bolted to the outer vertical face of trapezoidal leg 42 (FIG. 2). A tertiary support 54 for rod 48, which is unthreaded internally, is located beneath saw apparatus 14. Controlled, powered rotary drive for rod 48 is supplied from a control motor 56, through chain and sprocket assembly 58. Of course, motor 56 and chain and sprocket assembly 58 may be mounted on either stand 18, 20. A push button control 60 regulates forward and reverse movement of motor 56. Control 60 includes a standard forward-reverse magnetic starter (not shown).

Once an appropriate spacing between saw assemblies 14 and 16 is obtained, by moving the carriage of saw assembly 16 as just explained, it may be securely locked in place by means of an air pressure actuated brake lock 62 (FIG. 2), which depends from a mounting 64 at the lower base of trapezoidal leg 42. Brake lock 62 comprises the usual static cylinder and air pressure actuated piston, which includes an external foot or pad to firmly engage the undersurface of frame 12 (not shown). The proper, predetermined spacing of saw assemblies 14, 16 may be easily determined by providing a scale 66 (FIG. 3), etched on the upper surface of frame 12, or scribed on a separate strip and fastened thereto. If desired, rod 48 may be rotated manually; a squared extension 68 (FIG. 2) is formed on one end of rod 48, to receive a hand crank (not shown). When motor 56 is used to rotate rod 48, through control 60, the control (not shown) for brake lock 62 may also be wired to be tripped by control 60. That is, lock 62 will be released when control 60 is depressed to actuate motor 56, and lock 62 will be reengaged when control 60 is released to stop motor 56. If rod 48 is to be hand cranked, lock 62 may be relieved by tripping air lock release 70 (FIG. 2). The internal structure of release 70 is standard, and includes a second control for relocking brake lock 62 (not shown).

The unique conveying means of the invention combines a reciprocating feed action with means for engaging each workpiece in a static mode as it is cut, followed by ejection of the finished product from the invention, all of this occurring in a smooth, uninterrupted fashion. A storage hopper for the workpieces is formed by a rear pair of pickets 72, 72, and a vertically adjustable pair of pickets 74, 74, one set of pickets 72, 74, mounted on the rear portion of tables 28, 38. Each rear picket 72 is adjustable in the direction of the path of travel of workpieces through the invention by means of a slot 76 formed in base 78 of picket 72, and a pair of bolts 80, 80, threaded to tables 28, 38, respectively. The spacing between pickets 72, 74 depends upon the lateral dimension of the workpieces, which are nested vertically, one above the other, with their distal ends between the pairs of pickets 72, 74 and 72, 74, with the bottom workpiece (not shown) resting on worksurfaces 82, 82, which comprise the upper horizontal edges of conveyor supports 30, 40. This arrangement of vertically disposed pickets 72, 74 and 72, 74 is particularly adapted to handle flat trim workpieces. If molding or door casing pieces which have angular surfaces in cross-section are to be cut, it is desirable to replace pickets 72 with pickets angled 60° to a horizontal line, to the left in the sense of FIG. 1 (not shown) and stack only four to six workpieces at a time. Jamming is thus avoided while retaining continuous feed through the machine. Alternatively, pickets 72, 72 could be made pivotally adjustable, in a vertical plane, parallel to the direction of feed of workpieces through the invention, with respect to their bases 78, 78.

FIGS. 4 and 5 best illustrate the reciprocal feed portion of the novel conveyor assembly. Each conveyor support 30, 40 includes a dogged, reciprocating conveyor 84 which is mounted for reciprocal sliding movement in the direction of the path of travel of workpieces through the machine by means of a pair of V-grooved rails 86, 86, engaging a lateral slide 88, the longitudinal edges thereof being formed to fit the grooves of rails 86, 86. Slide 88 is firmly attached to conveyor 84 as by a plurality of bolts 90. Reciprocal action for conveyor 84 is supplied from air pressure cylinder 92, having a double acting piston therein (not shown) and a connecting rod 94, securing the piston to a bracket 96, attached to the rear end of conveyor 84. Cylinder 92 is firmly mounted on vertical conveyor support 30, or 40, by suitable means such as a bracket 98. Each conveyor 84 includes a workpiece supportive surface 85, generally coplanar with surfaces 82, 82, a plurality of retractable dogs 100, pivotally mounted medially thereof within conveyor 84. In the sense of FIG. 5, cylinder 92 moves conveyor 84 to the left so that a clog 100a passes beneath workpieces in the hopper formed by pickets 72, 74 and 72, 74 (not shown). As dog 100a passes beneath a lowermost workpiece, it rotates clockwise, about its pivot mounting, thereby leaving the workpiece undisturbed. Once past the workpiece, it pivots to the position shown in FIG. 5 and cylinder 92 is actuated to draw the workpiece, forwardly to a position to be cut. Note that four dogs 100a, 100 b, 100 c and 100d are provided. Each of the dogs is equispaced, one from the other, a distance approximating the stroke movement of conveyor 84, to avoid wasted motion.

As the workpiece moves to the first cutting station, beneath miter saws 102, 102, endless belt holddown systems 104, 104 engage the upper distal end surfaces of the workpiece (not shown) bearing the same against worksurfaces 82, 82. Each holddown system 104 (FIG. 2) includes an endless belt 106, trained about a pair of friction clutched pulleys 108, 108, which are each mounted on a bracket 110, located on table 28. The drag of each pulley 108 against rotational movement is adjustable so as to tension belt 106 appropriately. A holddown skid 112, located above the working portion of belt 106, further assists in movably clamping the workpieces against surfaces 82, 82 (FIG. 1). As shown in FIG. 1, each pulley 108, adjacent the feed end of the invention, may be laterally adjustable to further tension belt 106, by means of a slotted plate and nut assembly 114, and each picket 74 may be vertically adjusted by means of a slotted bracket and nut assembly 116, which serves to attach picket 74 to bracket 110. Pickets 74 are adjustable to a distance slightly greater than the thickness of a workpiece, to allow it to pass freely between worksurface 82 and picket 74. The vertical separation between belts 106 and worksurfaces 82 is also adjustable, depending upon the thickness of the workpieces, at 117 (FIG. 1) of bracket 110, allowing vertical adjustment of bracket 110 with respect to table 28, or 38.

Referring again to FIG. 5, dogs 100a move the workpiece to a first cutting position, where miter saws 102, 102 are actuated to move downwardly to cut the workpiece, in a manner to be explained below. At this point, the conveyor 84 will be in the position illustrated by FIG. 5. A stop 118 comprising a screw threaded to a block which is mounted on conveyor 84, abuts the upper terminal end of an arm 120, pivotally mounted to vertical support 30 at 122. The opposite end of arm 120 is secured to a connecting rod 124, which in turn is attached to the piston (not shown) of an air cylinder 126. At this point, cylinder 92 is fully charged to drive conveyor 84 to the right, in the sense of FIG. 5, but stop 118, abutting against arm 120, prevents completion of movement of conveyor 84. At this time, miter saws 102, 102, are lowered to cut the workpiece. Before the saws 102, 102 are raised, or, in other words, upon completion of one pass of these saws through the material, cylinder 126 is charged to draw connecting rod 124 thereinto, thereby pivoting arm 120 clockwise about its pivot point, and allowing cylinder 92 to complete movement of conveyor 84 to the right. The movement imparted is incremental only, so as not to disturb the position of workpieces in other work stations, yet it is sufficient to move the workpiece being cut by miter saws 102, 102, upon completion of one pass of these saws through the material, so as to effectively prevent tear out or undesired ripping of the initial cut as the miter saws 102, 102 return to their initial, non-working positions. At this stage, the workpiece is located to the right of dog 100a, shown in FIG. 5.

Simultaneous actuation of conveyors 84, 84, is assured by a complemental gear and rack system. FIGS. 4 and 5 indicate a rack 128, mounted along a lower side of conveyor 84, in mesh with a spur gear 130 having a central square bore mating with a squared shaft 132 extending therethrough. Shaft 132 is secured for free rotational movement by means of bearing 134, in vertical support 30, and bearing 136, in stand 20 (FIG. 2). Shaft 132 extends through a second spur gear and rack, similar to rack 128 and gear 130, located on the conveyor 84 mounted on movable saw assembly 16 In this manner, assembly 16 may be adjusted laterally of saw assembly 14 while maintaining this secondary rack and spur gear in mesh. The arrangement of the secondary rack and gear is not illustrated, since it is the same as that illustrated in FIG. 5, only in mirror image. Obviously, as conveyor 84 on vertical support 30 moves, such motion is translated by the gear and rack arrangement to the conveyor 84 located on vertical support 40 of saw assembly 16.

So far, but one reciprocal action of conveyor 84 has been described. As this action continues, the first workpiece described above is moved by dogs 100 down to another station, while dogs 100a move another workpiece from the hopper bed to be cut by miter saws 102, 102. Eventually, the first workpiece reaches a point directly beneath a pair of holdown cylinders 138, 138; at this stage, the workpiece will be forward of dogs 100c (FIG. 5). A pair of kerf saws 140, 140 are then actuated, in a manner to be explained below, to make a horizontal cut in each corner edge of the workpiece. Once this cut is completed, holddown cylinders 138, 138, each of which comprises a standard piston actuated foot clamp (not shown), are released, so that the completed workpiece may be ejected from the invention by dogs 100d. It will be noted here that both saw assemblies 14 and 16 will operate to cut head jamb trim members, while only one need be operative for the side jamb trim members. Additionally, it is clear that several workpieces will be passing through the invention, one forwardly of each dog 100, simultaneously, so that work will be continuous.

Turning now to FIGS. 6 and 7, the miter saws 102, 102 will be discussed. References here will be in the singular, since both saws 102, 102 are constructed similarly, one in mirror image of the other. A miter saw base bracket 142 is pivotally mounted to table 38 (or table 28, in the case of saw assembly 14) at 144, and is adjustably secured thereto by a lock 146. As can be seen in FIG. 3, saws 102 may be rotated about pivot 144 in a horizontal plane to vary the cut made by the saw. Lock 146 is arranged to engage circumferential edge 148; scribe lines (not shown) may appear on table 38 (or 28) to indicate the angle of the saw with respect to the workpiece, or in other words, with respect to a line parallel to frame 12. Normally, this angle will be either 45° or 90°, but any setting between these two extremes may also be made. Adjustment of saw 102 in a vertical plane is accomplished by mounting the circular saw blade 150 and the motor 152 therefor on a pivoting carriage 154 which, in turn, is mounted centrally thereof on a yoke 156. A belt and pulley drive arrangement 158 connects motor 152 to saw blade 150. In turn, yoke 156 is adjustably secured in saw base bracket 142 so as to pivot in a vertical plane about an axis formed by pin 159 and tightening screw 160. An upstanding ear 162, formed as a part of bracket 142, includes a slot 164 with an adjusting screw 166 passing therethrough, which is threaded to yoke 156. Thus, compound bevel adjustment for saw 102, in a horizontal as well as a vertical plane, is provided.

Saw 102 is automatically pivoted into a cutting position by means of an air pressure cylinder 168 having a piston therein (not shown) with a connecting rod 170 extending therefrom, having its free distal end attached to yoke 156 at 172. Cylinder 168 is dependingly, pivotally mounted on carriage 154 at 174. As can be seen in FIG. 7, a workpiece (not shown) will be placed in position by the conveying means discussed previously, between saw blade 150 and the upper surface of saw bracket 142. Saw blade 150 is set so that it rotates to force a workpiece against dogs 100 as it cuts, or counterclockwise in the sense of FIG. 7. A replaceable strip 176 is located in bracket 142 which serves as a protective receptacle for blade 150 after a cut is performed. Strip 176 may be made of plastic or wood. When a new strip is used, it is desirable to bleed pressure from cylinder 168 and manually lower blade 150 the first time so as to form an acceptable seat for blade 150.

Saw 150 should be a "chop" saw, as it is known in the art. In the preferred embodiment, saw blade 150 is 10 inches in diameter, with a ¾ inch mounting bore, and is of the fine trim variety, having a single discard tooth for every three cutting teeth, since the blade will be used in right as well as left hand application. Preferably, the hook angle will be zero, or even negative, in order to minimize the possibility of tear out.

Kerf saws 140, 140 and their mountings are best illustrated in FIG. 3. As in the case of the miter saws 102, 102, references will be made in singular form, since both kerf saws 140 are constructed similarly, one in mirror image of the other. For mounting purposes, each table includes a lower extension in the direction of the path of travel of workpieces through the invention. That is, table 28 includes a lower, kerf saw mount extension 178, which is also firmly welded or otherwise suitably joined to vertical support 30, and table 38 includes an extension 180, welded to vertical support 40. Each kerf saw 140 is mounted within the free end of a plate 182 which is pivotally mounted to extension 178, or 180, at 184. In the preferred embodiment, saw 140 includes a standard router motor 186 having either a 2 inch or 3 inch diameter blade thereon. Additionally, each motor 186 is vertically adjustable (not shown) so that the proper, horizontal kerf cut may be made in the workpiece at that station.

Plate 182, with saw 140, is pivoted within a horizontal plane, into and out of a cutting position by means of yet another air cylinder 190 having the usual air actuated piston therein (not shown) with a connecting rod 192 extending therefrom, which is joined at its free end to a pivot arm 194. Each arm 194 is adjustably secured to cylindrical collar 196, formed on plate 182, concentrically with respect to the vertical axis of pivot 184, so as to vary the arc of movement of plate 182 within a horizontal plane and thereby provide adjustability for the swath of the cut made by saw 140 as desired. Each cylinder 190 is mounted on an arm extension 198 of plate 178 or 180, and is adjustably mounted thereon (not shown) so as to provide further adjustability in the swath of the cut made by saw 140.

The operation of kerf saws 140, 140 is relatively simple. Once the workpiece has been cut by trim saws 102, 102, the workpiece is moved to a position beneath holdown cylinders 138, 138, by dogs 100c (FIG. 5). Cylinders 138, 138 are actuated to clamp the workpiece in a static position, whereupon cylinders 190, 190 are actuated to pivot kerf saws 140, 140 to make the desired horizontal kerf cut in the opposite distal edges of the workpiece. Of course, as in the case of saws 102, 102, only one saw 140 will be actuated when only one edge of the workpiece is to be cut.

Reference is now made to FIGS. 1, 2 and 3 for a discussion of the major control system 200 which serves to sequentially operate the various air cylinder actuated feed and cut assemblies previously described, and which is further equipped with means for regulating the speed of operation of the entire invention so that optimum speed is obtained without ripping or destroying workpieces passing through the invention. At the right hand side of FIGS. 1, 2, and 3, it can be seen that control system 200 basically comprises a stand 202 having a control axle 204 rotatably mounted thereon, which is positively driven by a gear reduction motor 206. Motor 206 includes suitable electrical connection (not shown) to a variable rheostat control 208, located on electrical junction box 210. Per se, the specific design and operation of both motor 206 and rheostat 208 form no part of the instant invention. Both are standard "shelf items." At any rate, it is obvious that the rotational speed of control axle 204 may be slowed or increased from rheostat 208.

A series of three cam plates 212, 214 and 216 are secured to axle 204 to rotate therewith, and are located operatively adjacent to a series of three valves 218, 220, and 222, (FIG. 3) which serve to operate the various air cylinders 92, 92; 168, 168; and 190, 190 of the invention. Air for the valves and cylinders is supplied from a remote source (not shown) to an air filter 224 to a standard pressure regulator 226. Numeral 228 represents the typical oiler for the air system. Separate controls for cylinders 126 and 138 are unnecessary, since cylinders 126 and 138 are actuated simultaneously with cylinder 190. Of course, air cylinder brake lock 62 is independently operable separately from automatic control system 200, from control 60 as previously explained.

The purpose for providing rheostat control 208, which governs the output of motor 206, and thus the rotational speed of axle 204 and cams 212, 214, and 216, is to increase or decrease the cycle of operation of control valves 218, 220 and 222, and thereby regulate the speed of operation of the entire invention through the various operative air cylinders which control feed and cut of the workpieces. For example, if workpieces are being ejected without being entirely and properly cut, the speed of motor 206 should be slowed by control 208 so that the workcycle of all air cylinders may be made complete. On the other hand, if the invention is operating quite satisfactorily, motor 206 may be speeded up a bit for more efficient production.

I claim

1. In combination with a workpiece cutting machine comprising a main frame, a first table support having workpiece cutting members mounted thereon, and a movable support carriage having additional workpiece cutting members thereon reciprocating means for intermittent feed of workpieces through the cutting machine comprising:
    a. means defining a pair of elongate work surfaces, one located adjacent the table support and the other located adjacent the support carriage;
    b. a pair of reciprocating conveyors, one for each of said work surfaces, and each having a workpiece supportive surface generally coplanar with its mating work surface, each conveyor being movable in a direction generally parallel to the path of travel of workpieces through the machine;
    c. a plurality of retractable dog means for each conveyor, each dog mounted through the plane of the workpiece supportive surface and being retractable therefrom when each conveyor moves in a direction opposite the path of travel of workpieces through the machine; and
    d. a plurality of workpiece holddown means, arranged to clamp a workpiece against the elongate work surfaces when the conveyors are moving in a direction opposite the path of travel of workpieces through the machine whereby said workpiece and additional workpiece cutting members may be operated to cut clamped workpieces;

said dog means being further operable to eject a workpiece from the machine upon completion of the cutting operation of the workpiece and additional workpiece cutting members; wherein said plurality of workpiece holddown means comprise:
    a. two pairs of pulleys, one pair arranged to overlie each elongate worksurface; and
    b. a pair of endless belts, one for each pair of pulleys, arranged thereover to compress a workpiece against the elongate worksurfaces;

wherein at least one pulley of each of said pair of pulleys is releasably clutched against rotational movement.

2. In combination with a workpiece cutting machine comprising a main frame, a first table support having a first pair of workpiece cutting means thereon, a movable support carriage, selectively positionable along the main frame with respect to the first table support, a second pair of workpiece cutting members mounted on the carriage, and conveyor means for passing workpieces through the machine, between said first and second pairs of workpiece cutting means, in a direction generally at right angles to the length of said main frame, means mounting one of each of said pairs of cutting means for selective positioning in a vertical and horizontal plane, each such mounting means comprising:
    a. a table base member;
    b. a base bracket, pivotally mounted on the table base member for movement in a horizontal plane;
    c. a yoke, pivotally secured to the base bracket for selective positioning in a vertical plane; and
    d. a cutting means mounting carriage, secured in the yoke,
and, wherein said base bracket further comprises:
    a. an upstanding ear;
    b. a pair of pivot pins, forming a generally horizontal pivot axis for said yoke, said yoke having a lower stem mounted between the pivot pins;
    c. means defining a semi-circular slot in said ear, above the axis of said pivot pins; and
    d. a screw, received through said semi-circular slot and threaded to said yoke, for selectively positioning said yoke in a vertical plane, about said horizontal axis formed by the pivot pins.

3. The invention as recited in claim 2 wherein said conveyor means for passing workpieces through the machine comprises:
    a. means defining a pair of elongate worksurfaces one adjacent the first table support, the other adjacent the support carriage;
    b. a pair of reciprocating conveyors, one for each worksurface, each having a workpiece supportive surface generally coplanar with said worksurfaces;
    c. a plurality of retractive dog means mounted through said workpiece supportive surfaces, for engaging a workpiece; and
    d. a plurality of workpiece holddown means, for clamping a workpiece against the worksurfaces when said dogs are retracted.

4. In combination with a workpiece cutting machine comprising a main frame, a first table support having a first pair of workpiece cutting means thereon, a movable support carriage, selectively positionable along the main frame with respect to the first table support, a second pair of workpiece cutting members mounted on the carriage, and conveyor means for passing workpieces through the machine, between said first and second pairs of workpiece cutting means, in a direction generally at right angles to the length of said main frame, means mounting one of each of said pairs of cutting means for selective positioning in a vertical and horizontal plane, each such mounting means comprising:
    a. a table base member;
    b. a base bracket, pivotally mounted on the table base member for movement in a horizontal plane;
    c. a yoke, pivotally secured to the base bracket for selective positioning in a vertical plane; and
    d. a cutting means mounting carriage, secured in the yoke,
and wherein each one of said first pair of cutting means comprises:
    a. a circular saw, rotatably mounted about a horizontal axis, on said mounting carriage;
    b. motor means for said saw; and
    c. drive train means interconnecting said circular saw and motor means;
said base bracket further including a circular saw reception strip, mounted coplanar with the cutting plane of the circular saw, and arranged so that a workpiece passes between said reception strip and circular saw in a curring operation.

5. The invention as recited in claim 4 wherein said conveyor means for passing workpieces through the machine comprises:
    a. means defining a pair of elongate worksurfaces one adjacent the first table support, the other adjacent the support carriage;
    b. a pair of reciprocating conveyors, one for each worksurface, each having a workpiece supportive surface generally coplanar with said worksurfaces;

c. a plurality of retractive dog means mounted through said workpiece supportive surfaces, for engaging a workpiece; and d. a plurality of workpiece holddown means, for clamping a workpiece against the worksurfaces when said dogs are retracted.

* * * * *